Figure 1:
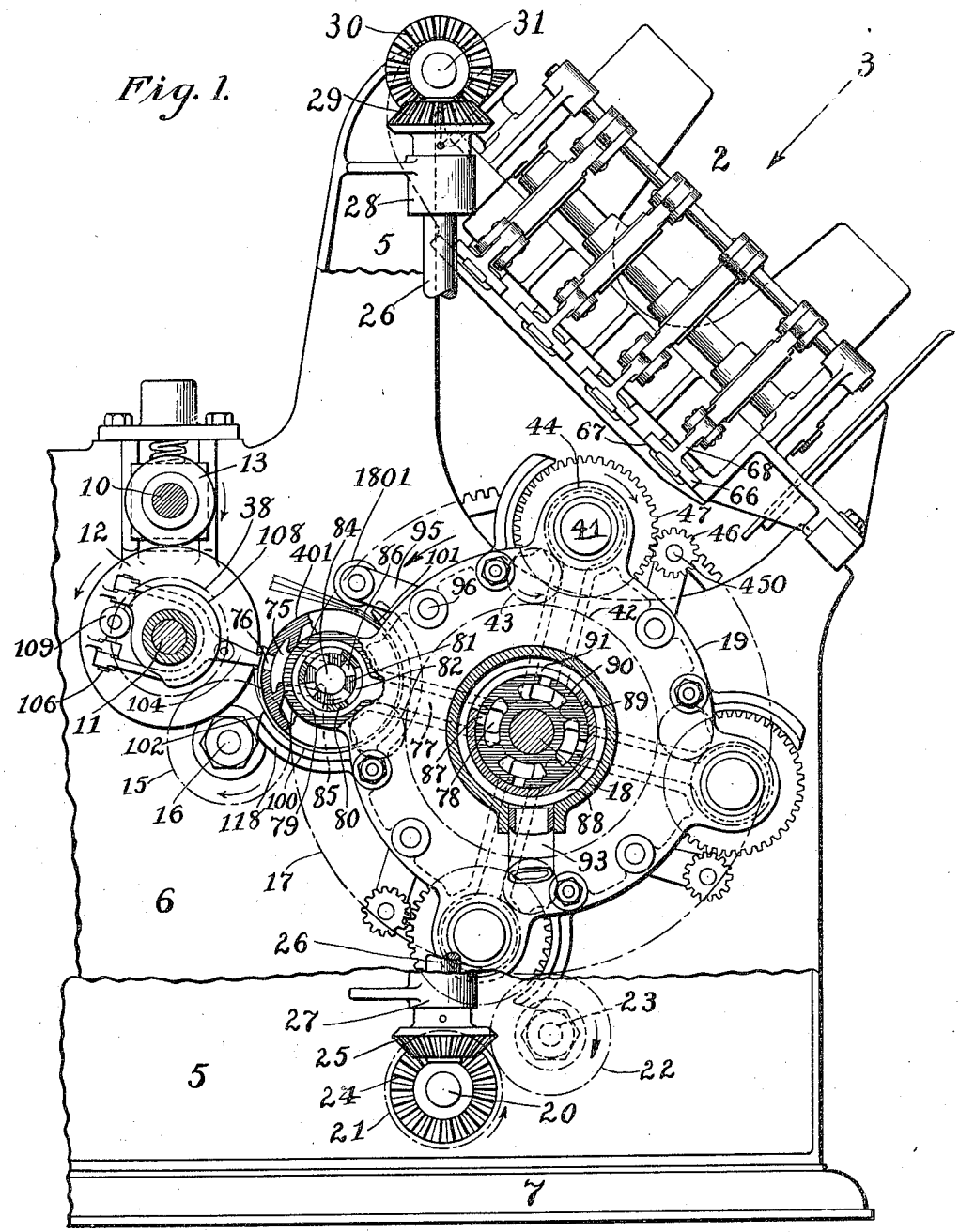

W. T. DULIN.
BLANK HANDLING MECHANISM.
APPLICATION FILED JUNE 9, 1911.

1,023,138.

Patented Apr. 16, 1912.
5 SHEETS—SHEET 1.

Witnesses:
Chas. W. La Rue
Louis B. Fischler

Inventor:
William T. Dulin
by Wilbur M. Stone
his Attorney

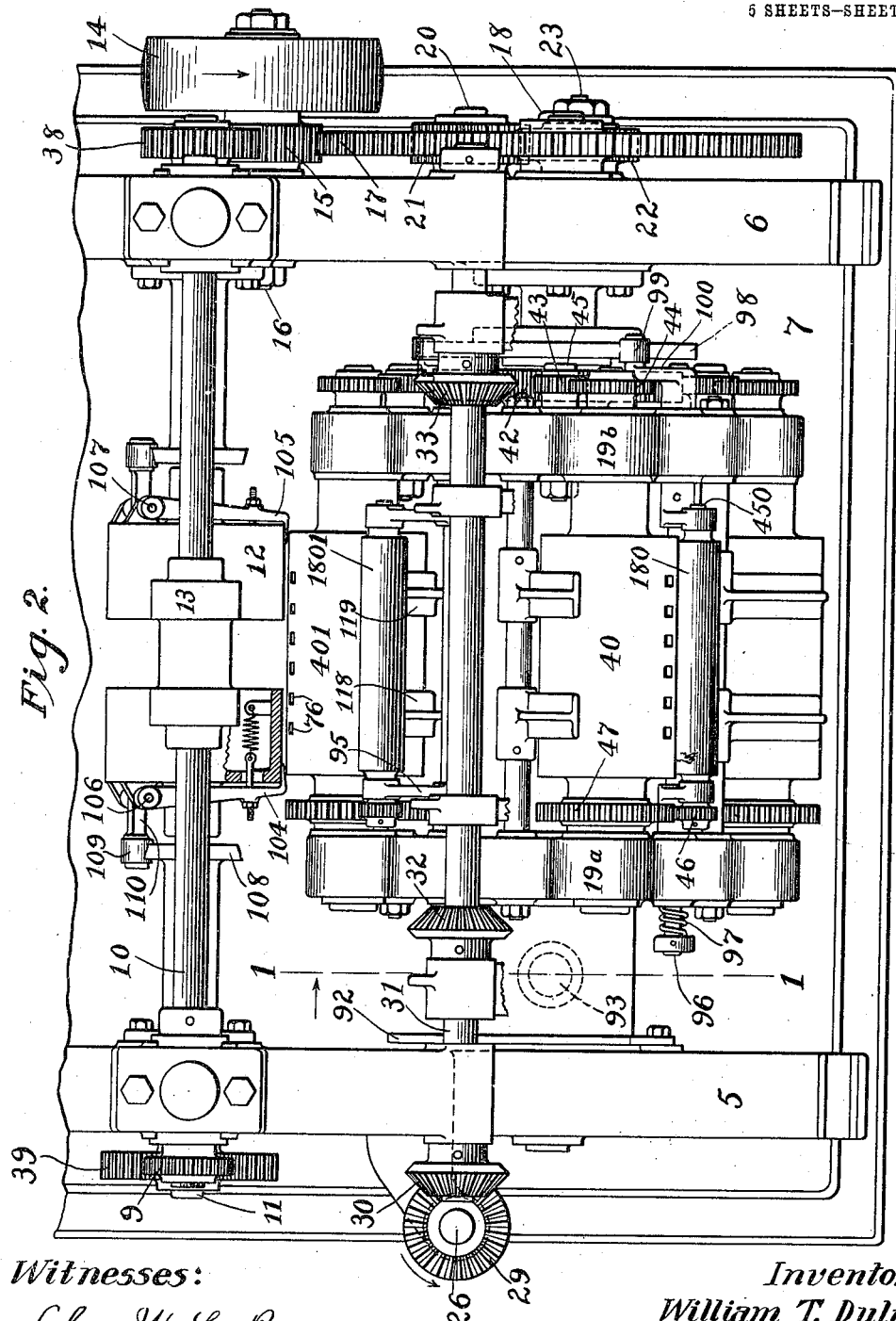

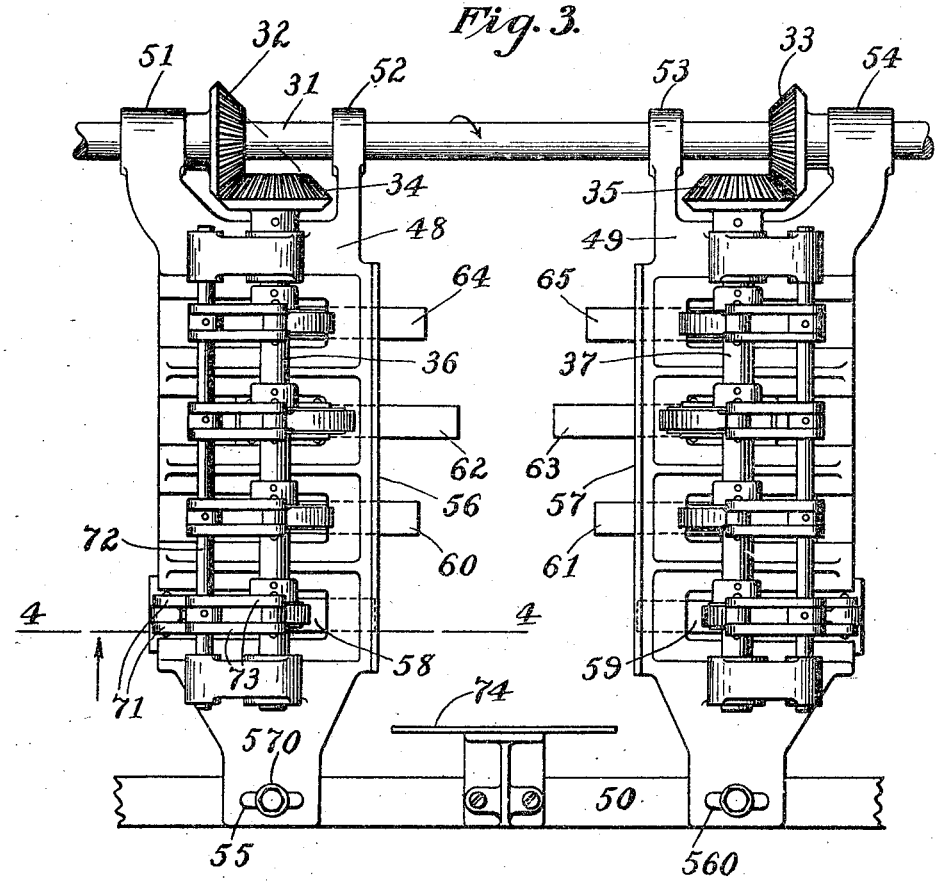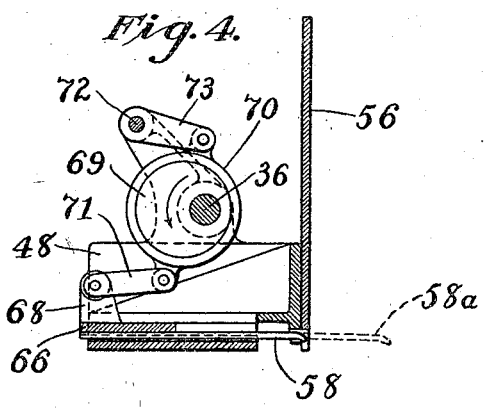

W. T. DULIN.
BLANK HANDLING MECHANISM.
APPLICATION FILED JUNE 9, 1911.
1,023,138.
Patented Apr. 16, 1912.
5 SHEETS—SHEET 4.
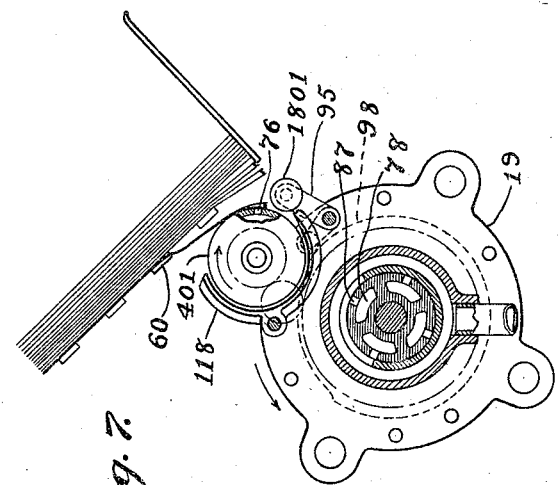
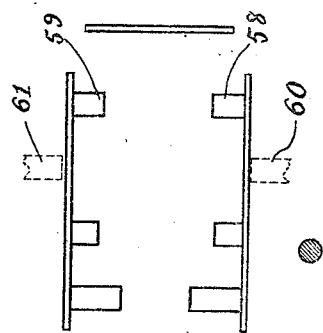
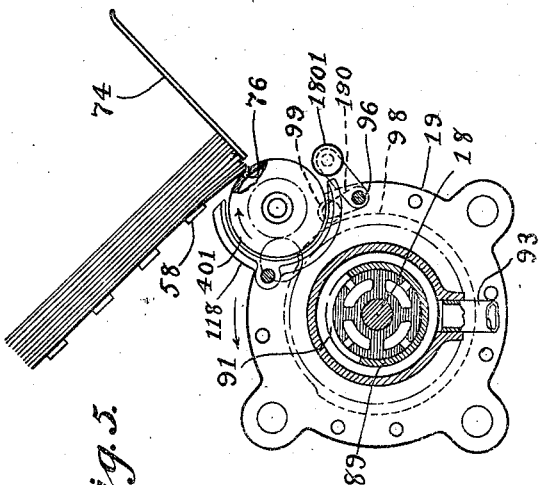
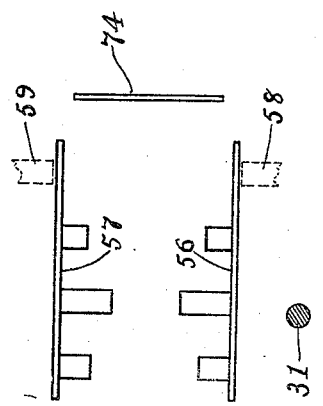
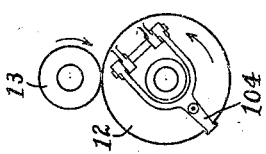
Witnesses:
Chas. W. La Rue
Louis B. Fischler
Inventor:
William T. Dulin
by Wilbur M. Stone
his Attorney W. T. DULIN.
BLANK HANDLING MECHANISM.
APPLICATION FILED JUNE 9, 1911.
1,023,138.
Patented Apr. 16, 1912.
5 SHEETS—SHEET 5.
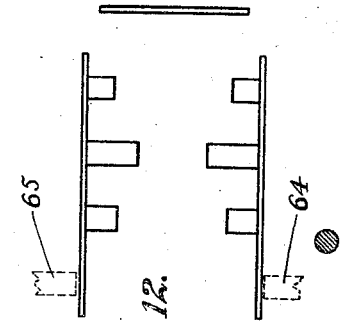
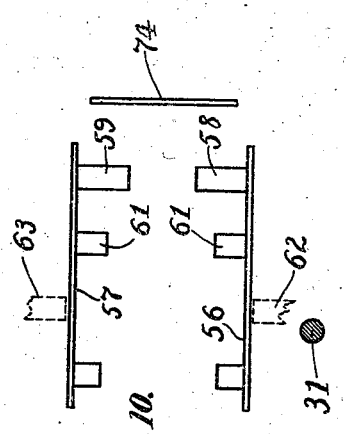
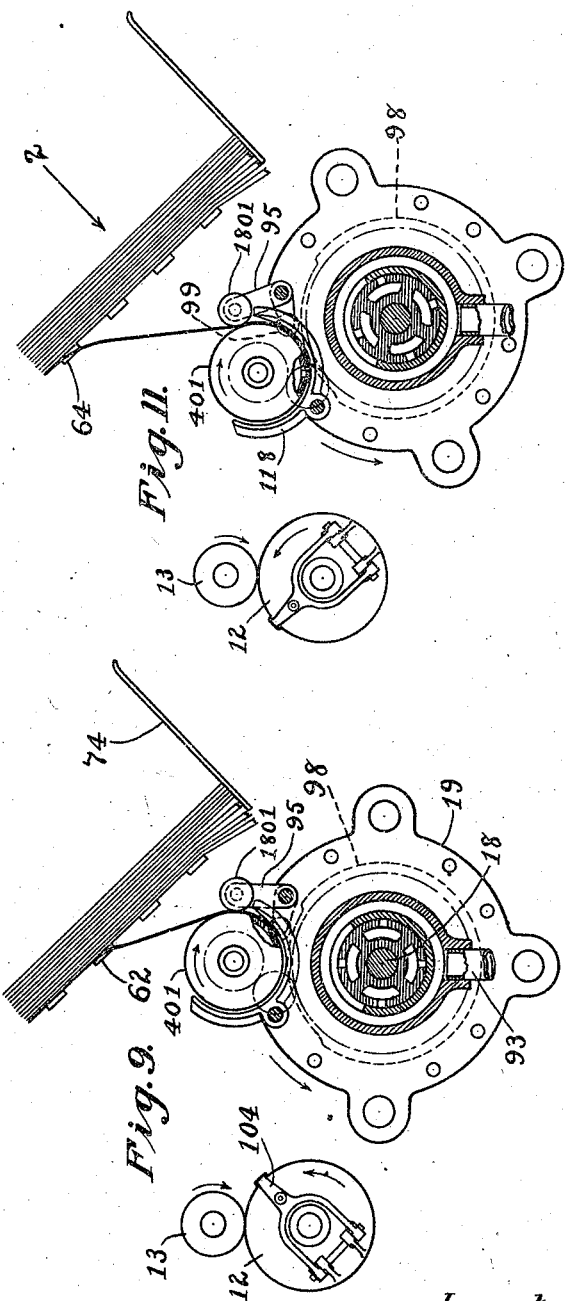
Witnesses:
Chas. W. La Rue
Louis B Fischler
Inventor:
William T. Dulin
by Wilbur M. Stone
his Attorney

UNITED STATES PATENT OFFICE.

WILLIAM T. DULIN, OF PHILADELPHIA, PENNSYLVANIA.

BLANK-HANDLING MECHANISM.

1,023,138.   Specification of Letters Patent.   Patented Apr. 16, 1912.

Application filed June 9, 1911. Serial No. 632,176.

*To all whom it may concern:*

Be it known that I, WILLIAM T. DULIN, a citizen of the United States, and a resident of Philadelphia, in the county of Philadelphia and State of Pennsylvania, have invented certain new and useful Improvements in Blank-Handling Mechanism, of which the following is a specification.

This invention relates to blank handling mechanism for sheet material.

The object of the invention is to provide means for successively removing blanks from a pile and delivering them, suitably timed, to means for performing other operations thereon.

My improvements are illustrated in their preferred form in the accompanying drawings wherein—

Figure 1 is a general side elevation with portions of the near side frame broken away and showing some portions in section on line 1, 1 of Fig. 2. Fig. 2 is a plan view corresponding with what is shown in Fig. 1 but with the blank hopper removed. Fig. 3 is a plan view on an enlarged scale of the blank hopper looking in the direction of arrow 3 of Fig. 1. Fig. 4 is a sectional elevation on line 4, 4 of Fig. 3. Figs. 5 to 12 inclusive are sectional elevations and diagrammatic plan views respectively, illustrating the delivery of a blank from the hopper to the transfer mechanism.

I have illustrated my improvements as particularly applied to the handling of tubular blanks of paper such as are used for forming into paper bags by closing one end thereof. As illustrated my improved mechanism is equally efficient in handling blanks of simple tubular construction or tubular blanks having the well known inwardly folded trucks therein.

One of the desirable results obtained by my improved mechanism is the delivery of successive blanks from that face of the pile opposite the point of supply and directly away from that face as in the direction of arrow 2, Fig. 11, without sliding or drawing those blanks in the direction of their length against the blanks remaining in the hopper. This is particularly desirable in the case of freshly printed blanks on which the ink is easily smeared.

*General description.*—My improved mechanism is illustrated as provided with side frames 5, 6 upstanding from a convenient base 7. Shaft 18 having bearings in said side frames, carries a planetary transfer mechanism comprising a plurality of rotating cylinders as 40 mounted between carrier heads $19^a$, $19^b$ fixed to and revolving with said shaft 18. Above said planetary transfer mechanism is the hopper mechanism indicated in a general way by 2, Fig. 1. This mechanism is provided to receive the blanks and deliver them one by one to the planetary transfer mechanism. To the left of the planetary transfer mechanism Fig. 1, is a pair of rolls 12, 13 for receiving the bag blanks from the planetary transfer and delivering them to any subsequent mechanism as for instance bottoming mechanism, not shown.

*Driving mechanism.*—The means for driving and timing relative to each other, the several rotating parts of my improved blank handling mechanism includes main pulley 14 to which is fixed gear 15, both turning on fixed stud 16 outstanding from frame 6. Said gear 15 drives gear 17 fixed to shaft 18 of transfer cylinder carrier 19. The transfer cylinders as 40, are fixed to shafts as 41, having bearings in carrier heads $19^a$, $19^b$. Said shafts have fixed thereto gears as 44 driven from fixed gear 42, mounted coaxial with carrier shaft 18, through intermediate gears as 43 fixed on studs as 45, outreaching from carrier head $19^b$. Gripping rolls as 180 are fixed to shaft as 450 having gears as 46 fixed thereto and driven from gears as 47, fixed to transfer cylinder shafts as 41. Shaft 20 having bearings in both side frames 5, 6 has gear 21 fixed to one end thereof and is driven from gear 17 through intermediate gear 22 turning freely on stud 23 outstanding from frame 6. On the other end of said shaft 20 is fixed bevel gear 24 driving bevel gear 25 fixed to the lower end of shaft 26. Said shaft 26 has bearings in ears 27, 28 outstanding from frame 5 and has fixed to its upper end bevel gear 29 driving bevel gear 30 fixed to cross shaft 31 having bearings in the upper ends of side frames 5, 6. Said cross shaft 31 has slidably fixed thereto bevel gears 32, 33 driving bevel gears 34, 35 fixed to hopper shafts 36, 37 all respectively. Blank receiving roll 12 is fixed to shaft 11 having bearings in side frames 5, 6. Gear 38 is fixed to one end of said shaft 11 and is driven from gear 15 of main pulley 14. Roll 13, coacting with receiving roll 12 is fixed to shaft 10 mounted in spring pressed bearings in frames 5, 6. Gear 9 fixed to said shaft 10 is driven from gear 39 fixed to shaft 11 of roll 12.

*Hopper mechanism.*—This mechanism, see particularly Figs. 1 and 3 comprises a pair of frames 48, 49 supported at one end on cross shaft 31 and at the other end by any suitable means as cross bar 50. Said bar 50 is in turn supported on suitable ears of frames 5, 6. Said frames 48, 49 are freely slidable on shaft 31 on bearings as 51, 52 of frame 48 and 53, 54 of frame 49. The opposite ends of said frames 48, 49 are cross-slotted at 55, 560 respectively and are secured to bar 50 by bolts as 570 threaded into said bar. Frames 48, 49 have fixed to their inwardly facing edges side walls 56, 57 respectively for guiding blanks placed therebetween. By the means just described walls 56, 57 may be adjusted toward and from each other to accommodate various widths of blanks. For supporting the pile of blanks between walls 56, 57 I provide a plurality of blades as 58 mounted for movement relative to said hopper. I preferably arrange said blades in one general plane in oppositely disposed pairs, as 58, 59 or 60, 61 and mount the members of each pair for reciprocation toward and from each other. Directing particular attention to blade 58, the means provided for its reciprocation from its retracted position, Figs. 3 and 4, to its operative or sustaining position, shown in dotted lines at 58ª, include slide 66 to the underside of which the rear end of said blade is attached. Said slide 66 is mounted in guide-way 67 and has ear 68 upstanding therefrom. To shaft 36 is fixed eccentric 69, to the strap 70 of which said ear 68 is connected by links 71, 71. Opposite the point of connection of links 71, 71 with strap 70, said strap is connected to some fixed portion as rod 72 of frame 48, by links 73, 73. By the means just described the rotation of shaft 36 will cause blade 58 to reciprocate back and forth as described. The other blades 60, 62, 64 in frame 48 are mounted and operated similarly to the mounting and operation just described in connection with blade 58 and are timed to operate in succession from 58 to 64. The blades of frame 49 are mounted and operated in all respects similar to the blades in frame 48 but each in opposite direction relative to its opposite blade. End wall 74 is supported from bar 50 and serves to support one end of the pile of blanks. I preferably arrange my improved hopper so that the general plane of the blades as 58 is inclined so that the blanks supported therein will gravitate toward said blades and toward end wall 74. It will be understood however that the plane of the blades as 58 might be either horizontal or vertical or at any desired angle therebetween and the blanks urged toward said blades by means other than gravity as well-known in the general art of blank handling.

*Planetary transfer mechanism.*—I preferably employ four transfer cylinders as 40 or 401 fixed to shafts as 41 having bearings in heads 19ª, 19ᵇ of rotatable carrier 19. Directing particular attention to cylinder 401 I will describe its features and coacting adjuncts and said description will serve equally well for the other cylinders in said carrier. Said cylinder 401 is provided with a suction chamber 75 therein communicating with the surface of said roll by means of one or more ports 76. Said ports are provided to hold, at proper times, the bag blank to said cylinder. Carrier head 19ª is provided with radial channels, as 77 leading from chamber 78, in the hub thereof, to annular chamber 79 about segmental bearing 80 of shaft 81, Said suction chamber 75 in cylinder 401 communicates with central chamber 84 of shaft 81 by means of channel 85 and said chamber 84 of shaft 81 communicates with chamber 79 about segmental bearing 80 through ports 86 in shaft 81 and ports 82 in bearing 80. There being four ports 86 and three ports 82, communication between central chamber 84 and annular chamber 79 is constantly maintained, no matter what the rotative position of shaft 81. Chamber 78 in hub 90 of carrier head 19ª is one of four similar chambers equally spaced in that hub and said chamber is provided with port 87 communicating with annular chamber 88 thereabout. Between said hub 90 and chamber 88 is annular valve 89 having a port 91 therein. Said valve 89 may be shifted by means of lever 92 to close and open ports as 87 at the desired time relative to the rotation of said carrier. Pipe 93 is provided to connect chamber 88 with some suitable source of exhaust, not shown. While I have illustrated cylinders as 401 of my improved transfer mechanism in its preferred form as provided with suction means for gripping the blanks thereto respectively, it is obvious that other gripping means such for instance as is shown on roll 12 may be efficiently substituted therefor. Each cylinder as 401 is provided with a gripping roll as 1801 mounted in swinging arms as 95 pivoted at 96 in carrier heads 19ª, 19ᵇ. Said roll is urged to engagement with cylinder 401 by a spring as 97 and is moved out of engagement with said cylinder by cam 98, Figs. 5, 7, 9 and 11, through roll 99 on arm 190 of shaft 96. Blank guides as 118, 119 are provided for each cylinder to keep the blank from derangement in its passage about said cylinders. Said guides have their working faces as 100 concentric with their respective cylinder and the entering ends as 101 thereof near their coacting gripping roll respectively, while their delivery ends as 102 are about diametrally opposite their entering ends respectively.

*Blank receiving means.*—This device comprises rotary roll 12 having a pair of oppositely disposed side clips or grippers 104, 105 suitably pivoted at 106, 107 on the ends of said roll 12. Said clips are of well known character and detail description is deemed unnecessary. Suffice it to say that said clips, as 104, are spring urged to their work and are lifted by means of the usual fixed cam as 108, through roll 109 on arm 110 outstanding from said side clip 104. Upper roll 13 coacts with roll 12 to deliver the successive blanks to any further mechanism not shown.

*Operation.*—The operation of my improved machine may be best understood from Figs. 5 to 12 inclusive. In Figs. 5 and 6 blades 58, 59 being retracted, the lower end of the lowest blank is allowed to project downwardly from hopper 2 and transfer cylinder 401 has just reached its receiving position with ports 76 against the lower face of said lowest blank. At the same time port 87 of chamber 78 in the carrier hub has rotated opposite port 91 of valve 89 thus putting the connecting system including ports 76 under tension whereby the lower ply of the lower blank is gripped to the face of cylinder 401. Cylinder 401 continuing its clockwise rotation and carrier 19 continuing its anti-clockwise rotation, said lowest blank is wrapped about said cylinder and the upper ply of said blank stands away somewhat as shown in Fig. 7. At the same time blades 60, 61 have retracted from under the pile of blanks and blades 58, 59 have begun to reënter under the pile but above the bottom blank which is being removed, Figs. 7 and 8. Also gripping roll 1801 is lifted to allow the open-mouthed end of the blank to pass thereunder. In Figs. 9 and 10 the blank has been liberated by the third pair of blades 62, 63 and the members 60, 61 of the second pair thereof have partially reentered under the remainder of the pile while blades 58, 59 have reached the extent of their inward movement. The leading end of the blank has passed under roll 1801 and under the entering end as 101 of guides as 118. In Figs. 11 and 12 the last pair of blades 64, 65 has released the blank and in Fig. 11 said blank is shown entirely in the control of the transfer mechanism. By reference to Figs. 7 and 9 it will be noted that a given point on the periphery of cylinder 401, as for instance ports 76, has a speed of general anti-clockwise movement slightly greater than that required for rolling contact at its point of engagement, Fig. 5, with the bag blank. This causes a slight slack in the blank in the positions of said Figs. 7 and 9 which slack is taken up in Fig. 11 by the departure of cylinder 401 from hopper 2. Reverting now to Fig. 1, a further step in the operation is depicted. Cylinder 401 has now completed one revolution from the position of Fig. 5 and is in rolling coaction with delivery roll 12. At the same time side clips 104, 105 enter the side tucks of the blank and grip the upper ply of said blank to roll 12. Immediately thereafter port 87 of chamber 78 in the hub of carrier 19 is closed by passing behind valve 89. The blank wrapper about cylinder 401 is thereby liberated and passes upwardly around roll 12 and under roll 13 to be discharged from the machine or delivered to other mechanism, not shown.

I claim:—

1. Blank handling mechanism including in combination, a hopper adapted for receiving a pile of blanks, comprising side walls relatively adjustable toward and from each other, means for discharging blanks successively from said hopper, including a plurality of pairs of oppositely disposed blank supporting blades mounted for movement relative to said hopper and means for successively moving said blades into and out of supporting position relative to said hopper.

2. Blank handling mechanism including in combination, a hopper adapted for receiving a pile of blanks, means for discharging blanks successively from said hopper, including a plurality of pairs of oppositely disposed blank supporting blades mounted for movement relative to said hopper and means for successively moving said blades into and out of supporting position relative to said hopper.

3. Blank handling mechanism including in combination, a hopper adapted for receiving a pile of blanks, means for discharging blanks successively from said hopper, including a plurality of pairs of oppositely disposed blank supporting blades, the members of each pair of blades being mounted for reciprocation toward and from each other and means for reciprocating said blades successively in pairs.

4. Blank handling mechanism including in combination, a hopper adapted for receiving a pile of blanks, opposite reciprocating blades for discharging blanks successively from said hopper, blank transfer means for receiving blanks from said hopper discharging means comprising a transfer cylinder having pneumatic blank holding means thereon, a rotatable carrier in which the transfer cylinder is rotatably mounted and means for rotating the carrier to move the transfer cylinder into coöperative relation with the hopper.

5. Blank handling mechanism including in combination, a hopper adapted for receiving a pile of blanks, opposite reciprocating blades for discharging blanks successively from said hopper, blank transfer means for receiving blanks from said hopper discharging means comprising a transfer cylinder, having pneumatic blank holding means thereon, a rotatable carrier in which the transfer cylinder is rotatably mounted, means for rotating the carrier and means for rotating the transfer cylinder to coact with the hopper.

6. Blank handling mechanism including in combination, a hopper having opposite reciprocating discharge blades, a blank transfer means for receiving blanks from the hopper comprising a transfer cylinder, pneumatic blank holding means on said cylinder, a rotatable carrier in which the transfer cylinder is rotatably mounted, means for rotating the carrier and means for rotating the transfer cylinder to coact with the hopper.

7. Blank handling mechanism including in combination, a hopper adapted for receiving a pile of blanks, means for discharging blanks successively from said hopper, blank transfer means for receiving blanks from said hopper discharging means comprising a transfer cylinder, a rotatable carrier in which the transfer cylinder is rotatably mounted, means for rotating the carrier and means for rotating the transfer cylinder to coact with the hopper, a gripping roll mounted in the carrier for coaction with the transfer cylinder and means for rotating the roll at the same surface speed as the cylinder.

8. Blank handling mechanism including in combination, a hopper adapted for receiving a pile of blanks, means for discharging blanks successively from said hopper, blank transfer means for receiving blanks from said hopper discharging means comprising a transfer cylinder, a rotatable carrier in which the transfer cylinder is rotatably mounted, means for rotating the carrier and means for rotating the transfer cylinder to coact with the hopper, a gripper roll mounted in the carrier for coaction with the transfer cylinder, means for rotating the roll at the same surface speed as the cylinder and means for moving the roll toward and from said cylinder.

9. Blank handling mechanism including in combination, a hopper having opposite reciprocating discharge blades, a rotary blank receiving means, blank gripping means thereon, blank transfer means for receiving blanks from said hopper and delivering them successively to the blank receiving means comprising a transfer cylinder having pneumatic blank holding means thereon, a rotatable carrier in which the transfer cylinder is rotatably mounted and means for timing the blank transfer means and the receiving means with each other.

10. Blank handling mechanism including in combination, a hopper having opposite reciprocating discharge blades blank transfer means comprising a plurality of transfer cylinders, pneumatic blank holding means on said cylinders, a rotatable carrier in which the transfer cylinders are rotatably mounted, means for rotating the carrier to move the transfer cylinders successively into coöperative relation with the hopper and means for rotating the transfer cylinders.

11. Blank handling mechanism including in combination, a hopper adapted for receiving a pile of blanks, means for discharging blanks successively from said hopper, including a plurality of blank supporting blades mounted for movement relative to said hopper, means for moving said blades into and out of supporting position relative to said hopper, blank transfer means for receiving blanks from said hopper discharging means comprising a transfer cylinder, a rotatable carrier in which the transfer cylinder is rotatably mounted, means for rotating the carrier to move the transfer cylinder into coöperative relation with the hopper and means for rotating the transfer cylinder.

12. Blank handling mechanism including in combination, a hopper adapted for receiving a pile of blanks, means for discharging blanks successively from said hopper, including a plurality of pairs of oppositely disposed blank supporting blades, the members of each pair of blades being mounted for reciprocation toward and from each other, means for reciprocating said blades successively in pairs, blank transfer means for receiving blanks from said hopper discharging means comprising a transfer cylinder, a rotatable carrier in which the transfer cylinder is rotatably mounted, means for rotating the carrier and means for rotating the transfer cylinder to coact with the hopper.

13. Blank handling mechanism including in combination, a hopper adapted for receiving a pile of blanks, means for discharging blanks successively from said hopper, including a plurality of blank supporting blades mounted for movement relative to said hopper, means for moving said blades into and out of supporting position relative to said hopper, blank transfer means for receiving blanks from said hopper discharging means comprising a transfer cylinder, a rotatable carrier in which the transfer cylinder is rotatably mounted, means for rotating the carrier and means for rotating the transfer cylinder to coact with the hopper, a gripping roll mounted in the carrier for coaction with the transfer cylinder and means for rotating the roll at the same surface speed as the cylinder.

14. Blank handling mechanism including in combination, a hopper adapted for receiving a pile of blanks, means for discharging blanks successively from said hopper, blank transfer means for receiving blanks from the hopper discharging means comprising a transfer cylinder, a rotatable carrier in which the transfer cylinder is rotatably mounted, means for rotating the carrier and means for rotating the transfer cylinder to coact with the hopper, blank holding means on said cylinder comprising a suction chamber in said carrier, a suction chamber in said transfer cylinder, a channel connecting said carrier chamber with said cylinder chamber, a suction port in the face of the transfer cylinder and means controlled by the rotation of the carrier for opening and closing respectively at predetermined times said channel.

15. Blank handling mechanism including in combination, a hopper adapted for receiving a pile of blanks, means for discharging blanks successively from said hopper, blank transfer means for receiving blanks from said hopper discharging means comprising a plurality of transfer cylinders, a rotatable carrier in which the transfer cylinders are rotatably mounted, means for rotating the carrier to move the transfer cylinders successively into coöperative relation with the hopper, means for rotating the transfer cylinders, a suction chamber in said carrier, a suction chamber in each of said transfer cylinders, channels connecting said carrier chamber with each of said cylinder chambers respectively, a suction port in the face of each transfer cylinder and means controlled by the rotation of the carrier for opening and closing respectively at predetermined times said channels.

16. Blank handling mechanism including in combination, a hopper adapted for receiving a pile of blanks, means for discharging blanks successively from said hopper, blank transfer means for receiving blanks from said hopper discharging means comprising a transfer cylinder, a rotatable carrier in which the transfer cylinder is rotatably mounted, means for rotating the carrier and means for rotating the transfer cylinder to coact with the hopper, blank holding means on said cylinder comprising a suction chamber in said carrier, a suction chamber in said transfer cylinder, a channel connecting said carrier chamber with said cylinder chamber, a suction port in the face of the transfer cylinder, means controlled by the rotation of the carrier for opening and closing respectively at predetermined times said channel and settable means for varying the times of opening and closing respectively said channel relative to the rotative position of said carrier.

17. Blank handling mechanism including in combination, a transfer cylinder, a rotatable carrier in which the transfer cylinder is rotatably mounted, means for rotating the carrier and means for rotating the transfer cylinder, blank holding means for said cylinder comprising a suction chamber in said carrier, a suction chamber in said transfer cylinder, a channel connecting said carrier chamber with said cylinder chamber, a suction port in the face of the transfer cylinder and means controlled by the rotation of the carrier for opening and closing respectively at predetermined times said channel.

18. Blank handling mechanism including in combination, a transfer cylinder, a rotatable carrier in which the transfer cylinder is rotatably mounted, means for rotating the carrier and means for rotating the transfer cylinder to coact with the hopper, blank holding means for said cylinder comprising a suction chamber in said carrier, a suction chamber in said transfer cylinder, a channel connecting said carrier chamber with said cylinder chamber, a suction port in the face of the transfer cylinder, means controlled by the rotation of the carrier for opening and closing respectively at predetermined times said channel, and settable means for varying the times of opening and closing respectively said channel relative to the rotative position of said carrier.

Signed at Philadelphia, Pa., this 6 day of June 1911 before two subscribing witnesses.

WILLIAM T. DULIN.

Witnesses:
CLARENCE SNYDER,
J. M. CULLEY.

Copies of this patent may be obtained for five cents each, by addressing the "Commissioner of Patents, Washington, D. C."